(12) United States Patent
Stewart et al.

(10) Patent No.: US 7,913,078 B1
(45) Date of Patent: *Mar. 22, 2011

(54) COMPUTER NETWORK VIRUS PROTECTION SYSTEM AND METHOD

(76) Inventors: Walter Mason Stewart, Potomac, MD (US); Marcelo Carrera, Silver Spring, MD (US); Robert G. Hook, Alexandria, VA (US); Ronald Rust, Leesburg, VA (US); Charles Shotton, Leesburg, VA (US)

( * ) Notice: Subject to any disclaimer, the term of this patent is extended or adjusted under 35 U.S.C. 154(b) by 317 days.

This patent is subject to a terminal disclaimer.

(21) Appl. No.: 11/650,561

(22) Filed: Jan. 9, 2007

Related U.S. Application Data

(63) Continuation-in-part of application No. 11/140,464, filed on May 31, 2005, now Pat. No. 7,506,155, which is a continuation of application No. 09/704,790, filed on Nov. 3, 2000, now Pat. No. 6,901,519.

(60) Provisional application No. 60/213,254, filed on Jun. 22, 2000.

(51) Int. Cl.
*H04L 9/00* (2006.01)

(52) U.S. Cl. .......... 713/152; 713/151; 713/150; 726/22; 726/24

(58) Field of Classification Search .................. None
See application file for complete search history.

(56) References Cited

U.S. PATENT DOCUMENTS

| | | | |
|---|---|---|---|
| 5,623,600 A | 4/1997 | Ji et al. | |
| 5,740,370 A | 4/1998 | Battersby et al. | |
| 5,832,208 A | 11/1998 | Chen et al. | |
| 5,842,002 A | 11/1998 | Schnurer et al. | |
| 5,889,943 A | 3/1999 | Ji et al. | |
| 5,918,054 A | 6/1999 | Jury et al. | |
| 5,940,614 A | 8/1999 | Allen et al. | |
| 5,956,481 A * | 9/1999 | Walsh et al. ............ 726/23 |
| 6,026,502 A | 2/2000 | Wakayama | |
| 6,092,194 A | 7/2000 | Touboul | |
| 6,094,731 A | 7/2000 | Waldin et al. | |
| 6,170,055 B1 | 1/2001 | Meyer et al. | |
| 6,185,678 B1 | 2/2001 | Arbaugh et al. | |
| 6,192,477 B1 | 2/2001 | Corthell | |
| 6,253,324 B1 | 6/2001 | Field et al. | |

(Continued)

FOREIGN PATENT DOCUMENTS

JP      11-167533      6/1999

(Continued)

OTHER PUBLICATIONS

U.S. Appl. No. 11/140,464 entitled "E-mail virus protection system and method", inventors Walter Stewart et al., filed May 31, 2005.

(Continued)

*Primary Examiner* — Pramila Parthasarathy

(74) *Attorney, Agent, or Firm* — Sterne, Kessler, Goldstein & Fox P.L.L.C.

(57) ABSTRACT

A network is protected from viruses through the use of a sacrificial server, which may be physical or virtual. Any executable programs or other suspicious parts of incoming e-mail messages are forwarded to a sacrificial server, where they are converted to non-executable format such as Adobe Acrobat PDF and sent to the recipient. The sacrificial server is then checked for virus activity. After the execution is completed, the sacrificial server is rebooted.

64 Claims, 5 Drawing Sheets

U.S. PATENT DOCUMENTS

| | | |
|---|---|---|
| 6,253,367 B1 | 6/2001 | Tran et al. |
| 6,311,273 B1 | 10/2001 | Helbig et al. |
| 6,377,691 B1 | 4/2002 | Swift et al. |
| 6,401,210 B1 | 6/2002 | Templeton |
| 6,487,664 B1 | 11/2002 | Kellum |
| 6,487,994 B2 | 12/2002 | Ahern et al. |
| 6,609,196 B1 | 8/2003 | Dickinson et al. |
| 6,721,784 B1 * | 4/2004 | Leonard et al. ............... 709/206 |
| 6,839,741 B1 * | 1/2005 | Tsai .............................. 709/217 |
| 6,901,519 B1 * | 5/2005 | Stewart et al. .................. 726/24 |
| 7,191,219 B2 | 3/2007 | Udell et al. |
| 7,263,561 B1 | 8/2007 | Green et al. |
| 7,487,544 B2 | 2/2009 | Schultz et al. |
| 7,640,361 B1 | 12/2009 | Green et al. |
| 2002/0035696 A1 | 3/2002 | Thacker |
| 2003/0225844 A1 | 12/2003 | Kuroda |
| 2005/0235164 A1 | 10/2005 | Gassoway |
| 2009/0132658 A1 | 5/2009 | Glickstein |

FOREIGN PATENT DOCUMENTS

| | | |
|---|---|---|
| JP | 11-252158 | 9/1999 |
| JP | 2000-29799 | 1/2000 |

OTHER PUBLICATIONS

U.S. Appl. No. 11/971,754 entitled "Computer Network Virus Protection System and Method", inventors Walter Stewart et al., filed Jan. 9, 2008.

"CERT® Advisory CA-1999-04 Melissa Macro Virus," http://www.cert.org/advisories/CA-1999-04.html.

"CERT® Advisory CA-2000-04 Love Letter Worm," http://www.cert.org/advisories/CA-2000-04.html.

"Declude Virus," htto://www.declude.com/Virus/index.html, © 2000-2002 Computerized Horizons.

"ViruSafe Firewall 1.5 Software Plus-In Blocks Viruses, Vandals," http://www.cryptosoft.com/snews/feb98/16029806.htm.

"ViruSafe™ Firewall," http://www.Bristol.de/virusafe2.html.

Brown, Reader Response Reveals e-mail hoax, Mar. 1998, Roanoke Times & World New start p. A5.

Cornetto, Advances in Web Technology cause e-mail client problems, Aug. 1998, InfoWorld, vol. 20, p. 13.

Horwitt, Communication Software: 104 Packages to get you on line, Nov. 1983, Business Computer Systems, vol. 2, abstract.

Microsoft, Microsoft Computer Dictionary, 1997, Microsoft Press, 3rd Edition, p. 173.

Microsoft, Microsoft Press Computer Dictionary, 1997, Microsoft Press, 3rd Sup. Edition, p. 141.

Newton, Newton's Telecom Dictionary, 1998, Telecom Books, 14.sup.th Edition, pp. 334-335.

Rad, Virus threat bytes computer users, Aug. 1998, Houston Chronicle.com, start p. 6.

U.S. Appl. No. 11/971,754 entitled "Computer Network Virus Protection System and Method", Non-Final rejection dated Feb. 24, 2009, inventors Walter Stewart et al., filed Jan. 9, 2008, 7 pgs.

U.S. Appl. No. 09/704,790 entitled "E-mail virus protection system and method", Non-Final rejection dated May 21, 2003, inventors Walter Stewart et al., filed Nov. 3, 2000, 16 pgs.

U.S. Appl. No. 09/704,790 entitled "E-mail virus protection system and method", Non-Final rejection dated Dec. 18, 2002, inventors Walter Stewart et al., filed Nov. 3, 2000, 21 pgs.

U.S. Appl. No. 09/704,790 entitled "E-mail virus protection system and method", Final rejection dated Nov. 25, 2003, inventors Walter Stewart et al., filed Nov. 3, 2000, 18 pgs.

U.S. Appl. No. 09/704,790 entitled "E-mail virus protection system and method", Final rejection dated Oct. 23, 2003, inventors Walter Stewart et al., filed Nov. 3, 2000, 18 pgs.

U.S. Appl. No. 11/140,464 entitled "E-mail virus protection system and method", Non-Final rejection dated Apr. 3, 2008, inventors Walter Stewart et al., filed May 31, 2005, 4 pgs.

U.S. Appl. No. 11/140,464 entitled "E-mail virus protection system and method", Non-Final rejection dated Aug. 24, 2006, inventors Walter Stewart et al., filed May 31, 2005, 16 pgs.

U.S. Appl. No. 11/140,464 entitled "E-mail virus protection system and method", Final rejection dated May 24, 2007, inventors Walter Stewart et al., filed May 31, 2005, 14 pgs.

U.S. Appl. No. 09/704,790 entitled "E-mail virus protection system and method", Notice of Allowability dated May 4, 2004, inventors Walter Stewart et al., filed Nov. 3, 2000, 4 pgs.

U.S. Appl. No. 11/140,464 entitled "E-mail virus protection system and method", Notice of Allowability dated Oct. 31, 2008, inventors Walter Stewart et al., filed May 31, 2005, 2 pgs.

U.S. Appl. No. 12/392,768 entitled, "Computer Virus Protection", inventors Walter Stewart et al., filed Feb. 25, 2009.

U.S. Appl. No. 11/971,754 entitled "Computer Network Virus Protection System and Method", Non-Final rejection dated Aug. 7, 2009, inventors Walter Stewart et al., filed Jan. 9, 2008, 13 pgs.

Non-Final Office Action in U.S. Appl. No. 12/392,768, mailed Jun. 9, 2010, 6 pgs.

* cited by examiner

COMPUTER NETWORK VIRUS PROTECTION SYSTEM AND METHOD

REFERENCE TO RELATED APPLICATIONS

The present application is a continuation-in-part of U.S. patent application Ser. No. 11/140,464, filed May 31, 2005 now U.S. Pat. No. 7,506,155, which is a continuation of U.S. patent application Ser. No. 09/704,790, filed Nov. 3, 2000, now U.S. Pat. No. 6,901,519, which claims the benefit of U.S. Provisional Application No. 60/213,254, filed Jun. 22, 2000. The disclosures of all of those applications are hereby incorporated by reference in their entireties into the present disclosure.

BACKGROUND OF THE INVENTION

1. Field of the Invention

The present invention relates generally to computer systems and computer networks. In particular, the present invention relates to a system and method for detecting and nullifying the effects of computer viruses. Still more particularly, the present invention relates to a system and method for detecting and nullifying the effects of computer viruses from messages and attachments (or payloads) delivered by electronic communications through a network.

2. Description of the Related Art

Computer viruses are a destructive aspect of the computer revolution that threatens its potential growth and usability. Significant time and money are lost annually combating the effects of this insidious, and seemingly endemic, problem. A computer virus is actually just an unauthorized block of executable computer code purporting to be harmless or is hidden in another valid computer program. Once the valid program is executed, the unauthorized virus code is also activated. The effect of such viruses can be simple pranks, such as causing messages to be displayed on the screen, or more serious activities, such as destroying programs and data. Once executed, they often spread quickly by attaching themselves to other programs in the system. Infected programs may in turn continue the cancerous replication by copying the virus code to still other programs. The proliferation of Internet E-mail has only accelerated the problem in that local viruses can now spread internationally in a matter of hours. Moreover, viruses and other malware are no longer limited to e-mail, but instead can now be spread by other types of electronic communication, such as instant messages and Internet relay chat (IRC).

Prior art attempts to reduce the effects of viruses and prevent their proliferation by using various virus detection schemes have been only marginally successful. The reason for the limited success is that the prior art methods attempt to identify the existence of a virus before taking steps to protect a user. For example, many virus detection programs use a method known as "behavior interception," which monitors the computer or system for key system functions such as "write," "erase," "format disk," etc. When such operations occur, the virus detection program prompts the user for input as to whether such an operation is expected. If the suspect operation was not expected (e.g., the user was not operating any program that employed such a function), the user can abort the operation. Another virus detection method, known as "signature scanning," scans program code that is being copied onto the system. Again, the virus detector searches for recognizable patterns of program code, such as the program attempting to write into specific file or memory locations, that betray the possible existence of a virus. Yet another prior art approach to virus detection performs a checksum (mathematical signature) on critical programs stored on a system that are known to be free of viruses. If a virus later attaches itself to one of these programs, the checksum value—which is periodically recalculated—will be different and thus, the presence of a virus detected.

While all of these methods work to some degree, they tend to suffer from one critical drawback: They depend on recognizing the virus as a virus before instituting any protection for the user. All too often, new (unrecognized) viruses must first wreak havoc on a significant number of victims before the new virus' identifying characteristics are recognized and included in the (ever-lengthening) watch lists of the various virus protection programs available to government and industry.

SUMMARY OF THE INVENTION

The present invention overcomes limitations of the prior art by implementing a system and method that eliminates the threat of viruses transmitted on a computer network by rendering any viruses inoperable. As discussed above, all viruses are programs. Like all programs, they are designed to run in a specific or predictable environment. Viruses depend on a host computer's operating system to recognize them as valid programs. They also depend on the host computer's central processing unit (CPU) to understand the virus' commands and obey them. Non executable entities are, by nature, incapable of launching a virus. Therefore, if a host computer converts all data received (e.g., e-mail and attachments) to non-executable entities, any embedded virus is rendered inoperable. The present invention describes a method and system of virus protection that involves passing all electronic communications through various conversion states that, while harmless to text and attachments, the conversions are lethal to executable code (viruses).

The present invention is applicable to all types of electronic communications. Examples include MIME (Multipart Internet Mail Extension) compliant messages, e-mail messages in general, instant messages (IM) or other computer-mediated messages delivered by an Internet Protocol (IP) transport protocol (e.g., HTTP, SMTP, SIP, or RPC) or any other transport protocol (e.g., a proprietary protocol). While illustrative embodiments will be disclosed with reference to e-mail, it will be understood that the invention is not so limited.

Even though the majority of e-mail and other electronic communications received by a company or government agency should contain no valid executable components, a small percentage of attachments, such as "working drafts," and standard contract templates may require user updating or valid executable macros. Therefore, the present invention also describes a system and method of identifying "Approved" embedded macros and—as long as they have not been modified—allowing them to survive the virus killing conversions.

Finally, the present invention also includes a unique "sacrificial PC" system and method capable of safely executing, detecting (via examination of the results of execution), and safely recovering from potentially virus-laden electronic communications.

BRIEF DESCRIPTION OF THE DRAWINGS

A preferred embodiment will be set forth in detail with reference to the drawings, in which.

DETAILED DESCRIPTION OF THE PREFERRED EMBODIMENT

Though not essential to every embodiment of this invention, the preferred embodiment makes use of the following concepts and principles:

1. Recipients of e-mails and other electronic communications are ultimately more qualified to determine what information is acceptable than a generalized software program or system
2. If given an opportunity, a user can clearly define which electronic communication types and attachments he or she does or does not wish to receive.
3. The ability of users to accept macros and other forms of executable code commonly used in modern computer generated business forms and templates must be maintained.
4. All information is potentially important to a user. Therefore, software systems, including security programs, should not arbitrarily delete or withhold content without specific knowledge and authorization of the owner of the communication system.
5. The value of information tends to decrease over time. Therefore, information contained in electronic communications should not be unreasonably delayed.

The gatekeeper method and system described herein operate under the following rules and definitions:

1. Any macro or executable code that alters the physical appearance of an e-mail or other electronic communications is considered by the gatekeeper to be a customized form.
2. All customized forms requiring user input must be authorized by the owner of the communication system.

In an effort to provide recipients with all of the contents of all communications and attachments (not prohibited by the owner of the communication system) all unauthorized form will be executed; however, the form's output (not the form itself) will be delivered to the user in a "safe" non-executable format.

The Gatekeeper method and system described defines an ability to authorize and authenticate all forms.

Figure 1:
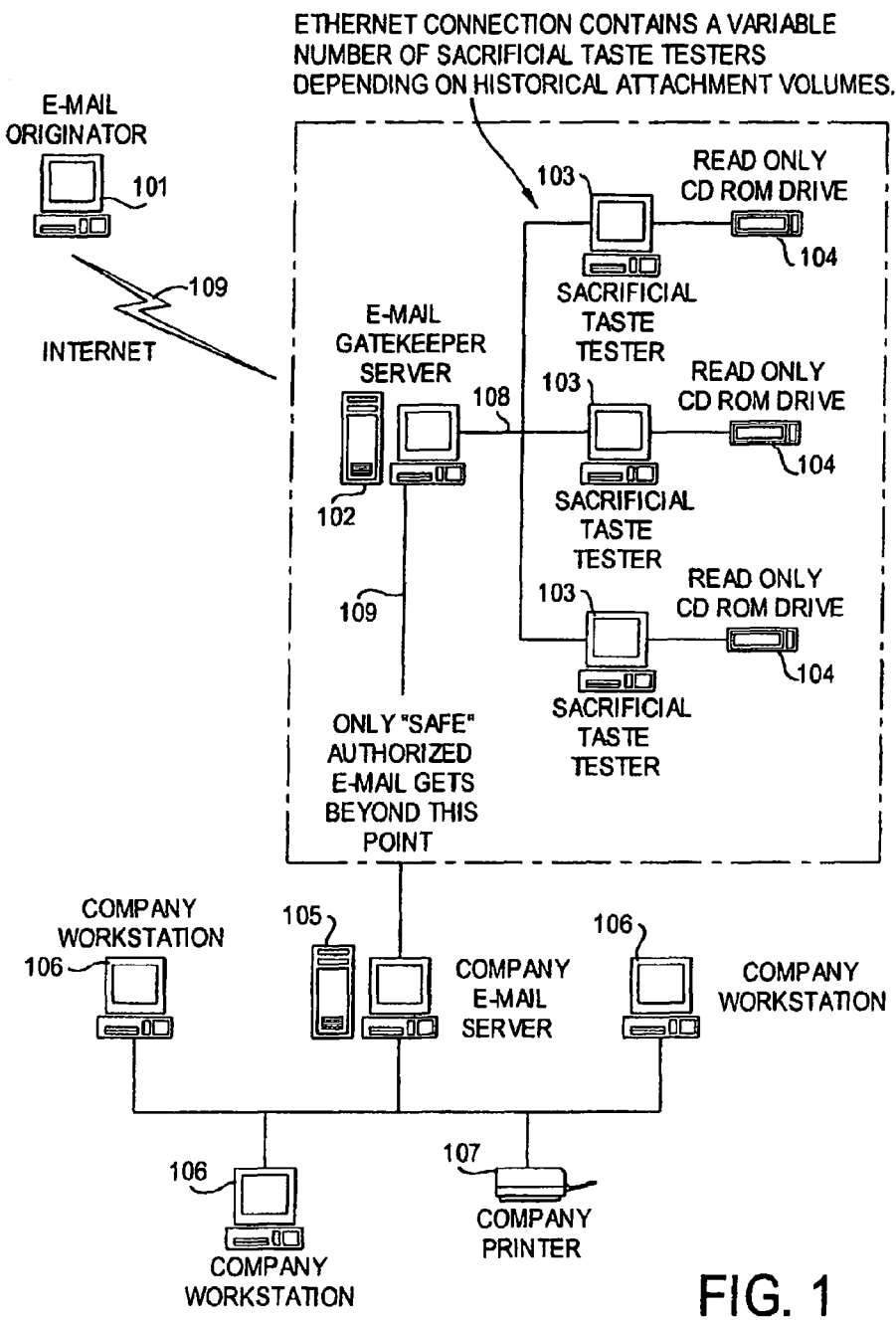
FIG. 1 shows a block diagram of an e-mail gatekeeper system.
Figure 2:
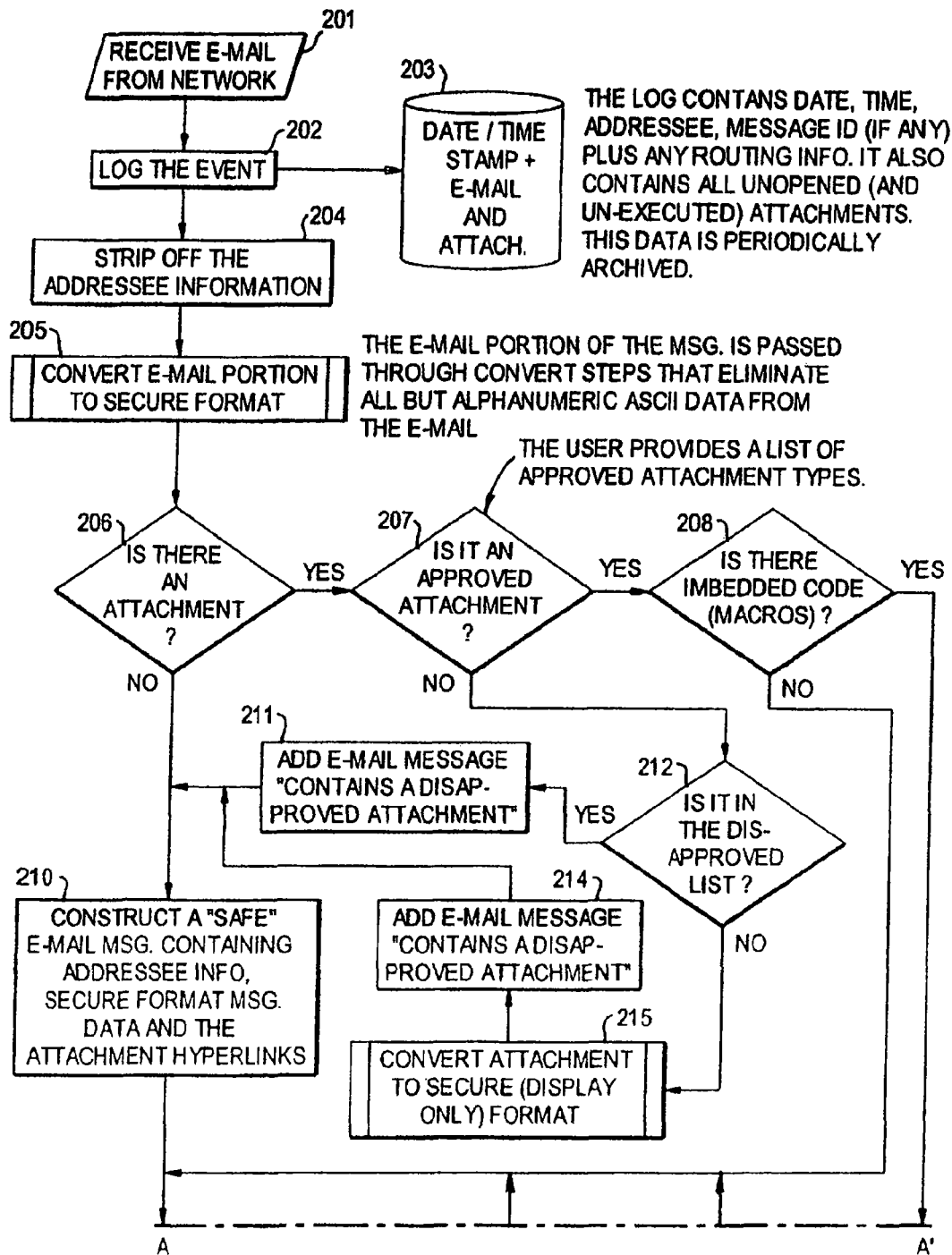
FIGS. 2 and 2A show a flow chart of operations carried out in the e-mail gatekeeper system.
Figure 2A:
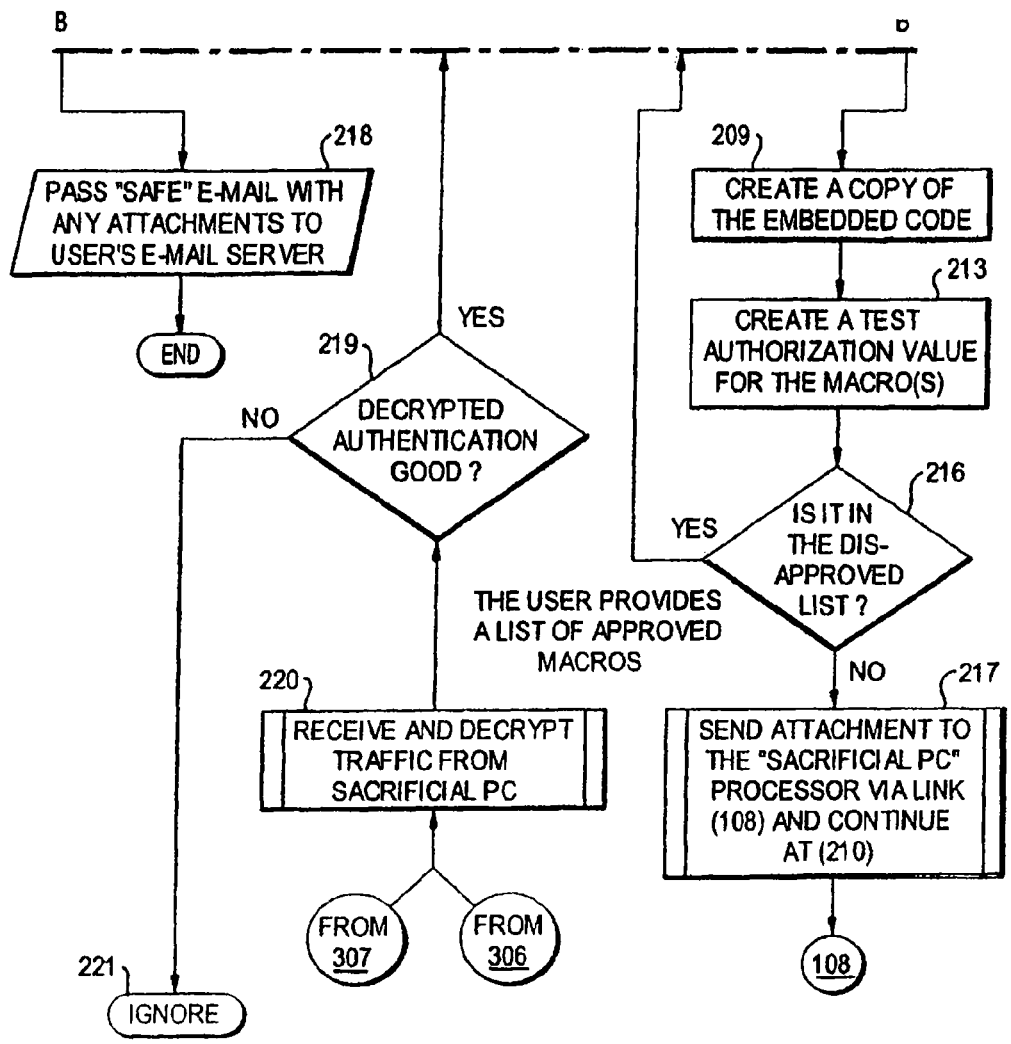
Figure 3:
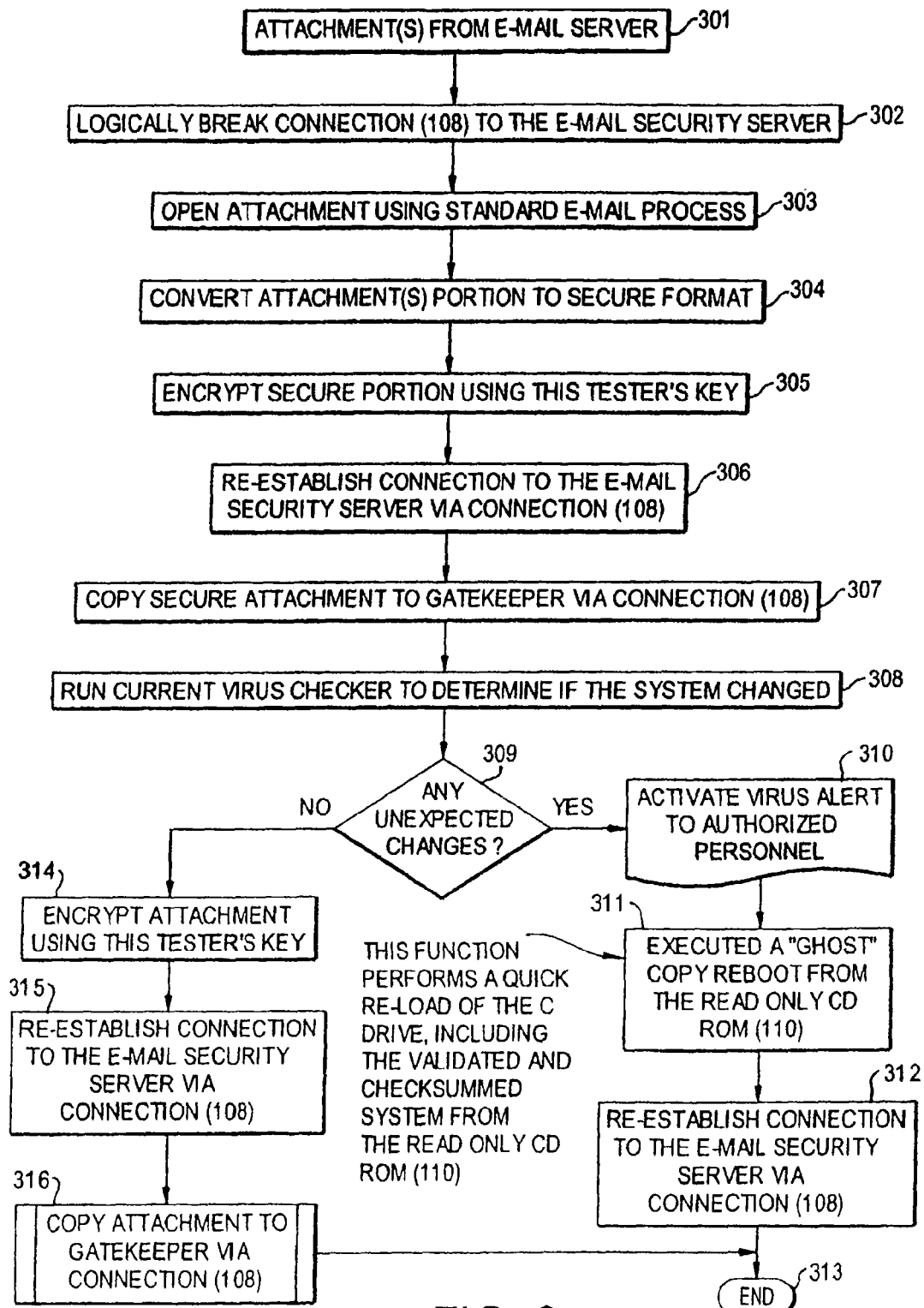
FIG. 3 shows a flow chart of operations carried out by a sacrificial processor.

The virus detection system and method of a preferred embodiment of the present invention preferably operates on a system as depicted in FIG. 1.

An intermediary E-mail security server (102), referred to as "the Gatekeeper" intercepts all e-mail messages and attachments sent by a sender (101) via a communications network, such as the Internet (109). The arriving unopened e-mail and attachments are archived and logged (202) with a date and time stamp, plus any routing information available. Address data is then stripped off the e-mail (204) for attachment to the "safe" e-mail constructed at (210). The e-mail portion of the Internet e-mail received from (201) is passed through a conversion process (205) that eliminates all executable code leaving only alphanumeric message text. Any imbedded hyperlinks or email addresses, while still identifiable as links or addresses, are rendered inoperable as executable "links." The Gatekeeper (102) then checks to see if the arriving e-mail contains an attachment (206). If the e-mail contains no attachment, processing continues at step (210).

If the e-mail contains an attachment, the attachment types (extensions) are validated against several lists provided by the client during the installation process. The e-mail attachment type is first checked against a list of client approved acceptable file extensions (207). If the attachment extension is not in the approved list, it is considered either disapproved or unknown and then the attachment type is checked against a list of client disapproved file extensions (212). If the attachment extension type is found in the disapproved list, a message is constructed indicating that "this e-mail contains a disapproved attachment" (211). The disapproval message is included in the safe e-mail constructed in step (210).

If the e-mail contains an attachment with an extension that is not in either the "disapproved" or "approved" lists, the entire attachment is passed through a conversion process (215) that eliminates all executable code leaving only alphanumeric message text. This process will generally create a readable copy of the attachment, but will not allow the attachment to open any processes or applications, including executable virus code. If the included attachment from (206) is of an approved extension type, attachment inspection processing continues at (208), which checks the approved attachment extension to see if it contains any executable code (macros). This process involves reading the attachment file's internal format and identifying any executable code, such as macros that may be present. Any executable code found is noted and identified for authentication (209). An encrypted authentication identifier is created for the executable code by passing it through an algorithm (such as a checksum, hashing, Boolean exclusive-or, or digital subtraction algorithm) (213), that uniquely identifies the string of executable code. The unique identifier is then encrypted using a key known only to the Gatekeeper program or server. The authentication identifier is then compared to a list of approved code contained by the Gatekeeper and supplied by the Client (216). Since this system and method described validates only the executable code (macros), the non-executable data portion of the attachment can safely be changed or updated interactively. If the attachment contains approved macros, the original attachment is made available to the recipient. If the attachments contain unapproved macros, the attachment is forwarded to an available sacrificial PC processor (103) via data link (108) for conversion to a non-executable format and further detailed virus testing. The method just described for detecting, authenticating, and approving a macro can be used to authenticate and approve any form of executable code embedded in an attachment or in the body of an e-mail message. Such code can include compiled programs, interpretive code, scripts, batch language, markup language code, or the like located in any part of the e-mail message, including the body and the attachments.

Sacrificial PC processing begins with the original e-mail attachment being passed to an available sacrificial PC (103) via a data link (108) connecting the Gatekeeper server (102) with the sacrificial PC. Once the transfer of the attachment is complete the data link (108) is intentionally broken. This eliminates the possibility of any unintended communications back to the Gatekeeper. The original attachment is then opened using standard Windows application processing supplied by the client (303). The opened attachment is then passed through a process (304) which converts the attachment to a non-executable image format, such as Portable Document Format (PDF). Note there are many suitable image formats. The process would choose one selected by the client. The safe image format version of the attachment is then encrypted in the sacrificial PC's unique authentication key assigned by the Gatekeeper at startup. The data link (108) to the Gatekeeper is then re-established (306) and the encrypted non-executable attachment is returned to the Gatekeeper (307).

All communications from a sacrificial PC to the Gatekeeper are interrogated by the Gatekeeper's communications processor (220). Before being accepted by the Gatekeeper as a valid message, the data must pass a strict authentication test (219). The authentication process is as follows.

At System startup (and periodically, if desired) the Gatekeeper creates a randomly generated set of authentication parameters to be used by each sacrificial PC when communicating with the Gatekeeper. When a sacrificial PC wants to communicate with the Gatekeeper it first sends a handshake packet to the Gatekeeper identifying the specific PC requesting communication. It also sends a short (unencrypted) cleartext portion of the data to be communicated encapsulated within the handshake packet.

Once the Gatekeeper acknowledges the handshake, the sacrificial PC sends the full information packet to the Gatekeeper. A random amount of the packet has been encrypted in the sacrificial PC's unique key. The specific amount of data encrypted by the sacrificial PC was determined by one of the authentication parameters sent by the Gatekeeper at startup. The Gatekeeper decrypts all data packets it receives based on the assumed key of the specific sacrificial PC. In other words, "If you are who you say you are, you encrypted your data in the following way." Once decrypted, the Gatekeeper compares the clear text portion of the data received in the handshake packet with the decrypted data packet (219). If they match, the data is accepted; if they do not, the data is not accepted. The authentication technique is based on known "challenge and response" authentication techniques. Another technique used is a time-out technique. If the gatekeeper does not hear back from a sacrificial PC in a given time, it is assumed that the sacrificial PC has succumbed to a virus. That sacrificial PC is then re-ghosted in the manner described in the present disclosure and then restarted.

Once the sacrificial PC has sent the read only "safe" attachment back to the Gatekeeper, a special validation process examines the sacrificial PC to determine if any unexpected changes have occurred (308) and (309) on the sacrificial PC. Unexpected changes could include the addition or deletion of files, files that change name, extension, or content unexpectedly, (including morphing of the tested attachment itself), attempted sensing of the date and time features of the sacrificial PC, etc.

Also, when the opportunity is available, as with attachments created using the Microsoft suite of office products, the sacrificial PC processor takes advantage of the "Enable Macros" "Disable Macros" feature. This built-in feature makes it possible to open a document without allowing any embedded code (macros) to execute. Two copies of the same document can then be created, one created with macros executed and one created without macros executed. The two copies of the same document can then be examined to determine if executing the macro had any effect on the information content of the document. By comparing the two documents, the sacrificial PC can determine whether or not the macro is relevant to the particular document being tested.

If execution of the macro was necessary to produce the information contained in the tested document, then the macro's contribution is contained in the print image copy of the document produced by the sacrificial PC when it executed the document with macros enabled. This is the copy that is sent to the recipient.

Similarly, if testing the document with "macros enabled" has no impact on the content of the document, then the suspect macro is not necessary. It logically follows then, that the suspect macro is either irrelevant to the content the particular version of the document being tested or, it is a virus. In either case, the sacrificial PC has intercepted and nullified the suspect macro's impact on the recipient.

Any unexpected changes in the system trigger a virus alert. Standard user security processes alert all authorized personnel (310). A special "ghosting" reload of the operating system then takes place. The process is as follows.

Each Sacrificial PC is configured with two hard drives. Each hard drive is configured with a single active partition and contains a safe copy of the operating system obtained from the read-only device (104). The designated active partition—defined at start-up—is "toggled" between the two physical hard drives. This is done to increase the speed of reloading and to maximize the availability of sacrificial PCs. The unused drive—which is the one used to test the last attachment—is re-loaded, via ghosting software (311), with a fresh copy of the operating system obtained from the read only CD ROM (104). The connection between the Gatekeeper (102) and the sacrificial PC (103) is then re-established.

Once the sacrificial PC is re-ghosted, it is brought back on line and the GateKeeper assigns it a new authentication Key and encryption length parameter.

Once the Gatekeeper sends data to a sacrificial PC, it notes the time the data was sent. If no data is received back from a sacrificial PC within a specified period of time (typically two minutes), the Gatekeeper assumes the sacrificial PC has become the victim of a virus and died. When this occurs, the Gatekeeper signals a virus alert and requests human intervention to recover the dead sacrificial PC.

The method and system described above can also be implemented with the sacrificial PC implemented as a virtual machine or environment in the operating system of another computer. This computer could be the gatekeeper, an e-mail server or any other computer.

The method and system described above can also be implemented with the gatekeeper system implemented as part of another system, such as a component of an already existing e-mail server.

More generally, the various servers can be logical partitions on a single machine rather than physically separate servers. For example, the gatekeeper server, the sacrificial servers, or both can be emulated or partitioned execution spaces on a single host computer. In that case, each sacrificial server should have its own emulated or partitioned execution space. The network communications between the gatekeeper server and the sacrificial servers can occur via shared memory, hardware backplane, an internal communications protocol, operating-system-level networking protocols, or interprocess communications between emulated or partitioned spaces on a host computer.

Figure 4:
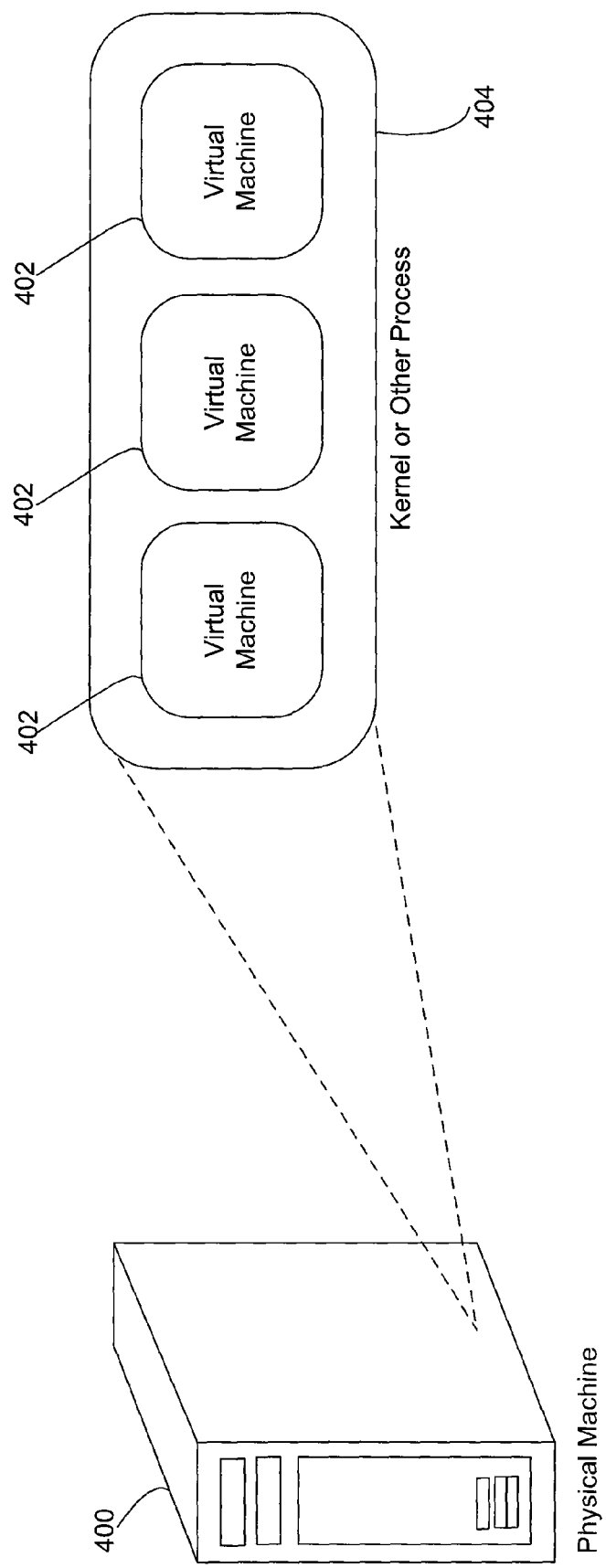
FIG. 4 shows a conceptual diagram of a physical machine running multiple virtual machines.

An explanation and examples of virtual machines will now be given. Broadly, as shown in FIG. 4, a physical machine 400 runs multiple virtual machines 402 under control of a kernel or other process 404.

Several techniques could be used. Three such techniques are: 1. Emulated CPU/OS combination on a guest operating system; 2. "Virtualized" OS co-hosted with a native operating system; and 3. Multi-level Secure operating system hosting separate execution partition.

The first is the traditional implementation of "virtual" computing. An example would be multiple virtual computers running inside an application like VMWare (Windows) or Virtual PC (Mac OS X). In these cases, all of the hardware is emulated in software, and the storage media are simulated disk drives using a data file in the host operating system to represent the storage for the virtual operating system. Re-ghosting simply becomes a process of destroying (terminating) the virtual machine, deleting the data file used as storage for the emulated disk drive(s), and copying fresh versions of the disk file data for a new virtual machine to run on.

The second is a newer technique implemented by software like WINE (Windows/Linux) and Parallels (Mac OS X) and is probably not a preferred implementation, as it would allow potentially infected processes to run on the same hardware as the host O/S. Most virtualization schemes use the same disk emulation technique as described above in the first example, so reloading the virtual OS and associated "hard disk" would be a matter of copying clean versions of the data files to the proper location and restarting the virtualized OS.

The third is the technique used by many classified systems involved in dealing with multiple levels of security and data access on a single hardware platform. It is implemented in native operating systems like VxWorks. This is a certified software and hardware platform that can be partitioned into multiple process spaces. Each process space is given specific physical memory and hardware devices it can interact with and all are managed from a central "kernel" that manages multitasking between the various secure partitions. In this case, reloading (ghosting) the system would happen much more as it would in the case of separate physical machines, with clean copies of the drives being loaded from read-only media such as a DVD or CD-ROM.

The gatekeeper system and method described uses the file and macro authentication and encrypted client approval techniques described above to protect itself from both internal and external "hacking" attacks that may attempt to substitute, modify, destroy or otherwise nullify gatekeeper files and programs.

While a preferred embodiment has been set forth in detail above, those skilled in the art who have reviewed the present disclosure will readily appreciate that other embodiments can be realized within the scope of the invention. For example, the use of certain hardware, operating systems, or the like should be construed as illustrative rather than limiting. Also, the concept of computer-mediated messages should be construed to include such messages as transmitted by technologies that exist now or may be invented in the future, such as electro-chemical and quantum photon link technologies. Therefore, the present invention should be construed as limited only by the appended claims.

We claim:

1. A method for protecting against a potentially virus-infected message, the method comprising:
   receiving an original message comprising an executable code in a gatekeeper server;
   forwarding the original message from the gatekeeper server to a sacrificial server;
   creating from the original message a non-executable format message by using one of a plurality of application-level conversion processes selected in accordance with a type of the message, the non-executable format retaining an appearance, human readability and semantic content of the original message; and
   forwarding the non-executable format message to an intended recipient of the original message.

2. The method of claim 1, wherein the executable code is contained in a body of the original message.

3. The method of claim 2, wherein the executable code comprises a hypertext link, and wherein the creating comprises deactivating the hypertext link.

4. The method of claim 1, wherein the executable code is contained in an attachment of the original message.

5. The method of claim 4, wherein a plurality of sacrificial servers are in communication with the gatekeeper server, the attachment from the gatekeeper server is forwarded to one of the plurality of sacrificial servers, and the creating is carried out on the sacrificial server to which the attachment has been forwarded.

6. The method of claim 5, wherein the plurality of sacrificial servers are physically separate from the gatekeeper server.

7. The method of claim 5, wherein the plurality of sacrificial servers are logically separate from the gatekeeper server, with separation being provided by emulated or partitioned execution space that is distinct for each sacrificial server and the gatekeeper server.

8. The method of claim 4, wherein the creating comprises:
   maintaining a list of approved attachment file types and extensions;
   determining whether the attachment is of a type or extension which is in the list of approved attachment file types and extensions; and
   if the attachment is not of a type or extension which is in the list of approved attachment file types and extensions, informing the recipient that a message containing a non-approved attachment has been received.

9. The method of claim 1, further comprising examining the sacrificial server for virus activity.

10. The method of claim 9, further comprising rebooting the sacrificial server from a safe copy of an operating system obtained from a read-only device.

11. The method of claim 1, further comprising authenticating communication between the gatekeeper server and the sacrificial server using a challenge-and-response technique.

12. The method of claim 1, wherein the creating comprises:
    maintaining a list of approved executable code;
    determining whether the executable code is in the list of approved executable code; and
    deactivating the executable code if the executable code is not in the list of approved executable code.

13. The method of claim 12, wherein the list of approved executable code includes information for determining whether the approved executable code has been altered, and the creating further comprises:
    determining whether the executable code has been altered; and
    deactivating the executable code if the executable code has been altered.

14. The method of claim 13, wherein the determining whether the executable code has been altered is performed through an algorithmic technique.

15. The method of claim 14, wherein the algorithmic technique is a check-summing technique.

16. The method of claim 14, wherein the algorithmic technique is a hashing technique.

17. The method of claim 14, wherein the algorithmic technique is a Boolean exclusive-or technique.

18. The method of claim 14, wherein the algorithmic technique is a digital-subtraction technique.

19. The method of claim 1, wherein the creating comprises:
    forming a first copy and a second copy of at least a portion of the original message containing the executable code;
    executing the executable code in the first copy but not the second copy; and
    if the executable code in the first copy has been executed, comparing the first copy to the second copy to determine an effect of the executable code.

20. The method of claim 1, wherein the gatekeeper server and the sacrificial server are implemented as virtual machines.

21. A system for protecting against a potentially virus-infected message, the system comprising:
a workstation computer on a network associated with an intended recipient of an original message comprising an executable code;
a gatekeeper server, in communication with the workstation computer, for receiving the original message; and
a sacrificial server on the network for creating from the original message a non-executable format message by using one of a plurality of application-level conversion processes selected in accordance with a type of the message, the non-executable format retaining an appearance, human readability and semantic content of the original message and forwarding the non-executable format message to the workstation computer.

22. The system of claim 21, wherein the gatekeeper server is an emulated or partitioned execution space on a host computer.

23. The system of claim 21, wherein the sacrificial server is an emulated or partitioned execution space on a host computer.

24. The system of claim 21, wherein the gatekeeper server and the sacrificial server are emulated or partitioned execution spaces on a host computer, and wherein the gatekeeper server and the sacrificial server communicate via shared memory, hardware backplane, internal communications protocol, operating system level networking protocols, or inter-process communications between emulated or partitioned execution spaces on the host computer.

25. The system of claim 21, wherein the executable code is contained in a body of the original message.

26. The system of claim 25, wherein the executable code comprises a hypertext link, and wherein the creating comprises deactivating the hypertext link.

27. The system of claim 21, wherein the executable code is contained in an attachment of the original message.

28. The system of claim 21, wherein the sacrificial server is one of a plurality of sacrificial servers which are in communication with the gatekeeper server.

29. The system of claim 28, wherein the plurality of sacrificial servers are physically separate from the gatekeeper server.

30. The system of claim 28, wherein the plurality of sacrificial servers are logically separate from the gatekeeper server and execute in emulated or partitioned execution spaces.

31. The system of claim 28, wherein the plurality of sacrificial servers are examined for virus activity.

32. The system of claim 31, wherein the network further comprises a read-only device, and wherein the sacrificial servers are rebooted from a safe copy of an operating system obtained from the read-only device.

33. The system of claim 28, wherein communications between the gatekeeper server and the sacrificial servers are authenticated using a challenge-and-response technique.

34. The system of claim 21, wherein the network maintains a list of approved attachment file types and extensions, determines whether the attachment is of a file type or extension which is in the list of approved attachment file types and extensions, and, if the attachment is not of a file type or extension which is in the list of approved attachment file types and extensions, informs the recipient that a message containing a non-approved attachment has been received.

35. The system of claim 21, wherein the network maintains a list of approved executable code, determines whether the executable code is in the list of approved executable code, and deactivates the executable code if the executable code is not in the list of approved executable code.

36. The system of claim 35, wherein the list of approved executable code includes information for determining whether the approved executable code has been altered, the network determines whether the executable code has been altered, and the executable code is deactivated if the executable code has been altered.

37. The system of claim 36, wherein the system determines whether the executable code has been altered through an algorithmic technique.

38. The system of claim 37, wherein the algorithmic technique is a check-summing technique.

39. The system of claim 37, wherein the algorithmic technique is a hashing technique.

40. The system of claim 37, wherein the algorithmic technique is a Boolean exclusive-or technique.

41. The system of claim 37, wherein the algorithmic technique is a digital-subtraction technique.

42. The system of claim 21, wherein the sacrificial server creates the non-executable format message by:
forming a first copy and a second copy of at least a portion of the original message containing the executable code;
executing the executable code in the first copy but not the second copy; and
if the executable code in the first copy has been executed, comparing the first copy to the second copy to determine an effect of the executable code.

43. The system of claim 21, wherein the gatekeeper server and the sacrificial server are implemented as virtual machines.

44. A sacrificial server for protecting against a potentially virus infected message, the sacrificial server comprising:
communication means for receiving an original message attachment from a network; and
processing means for creating from the original message attachment a non-executable format message attachment by using one of a plurality of application-level conversion processes selected in accordance with a type of the message, the non-executable format retaining an appearance, human readability and semantic content of the original message and for returning the non-executable format message attachment to the network.

45. The sacrificial server of claim 44, wherein the processing means creates the non-executable format message attachment by:
forming a first copy and a second copy of at least a portion of the original message attachment containing an executable code;
executing the executable code in the first copy but not the second copy; and
if the executable code in the first copy has been executed, comparing the first copy to the second copy to determine an effect of the executable code.

46. The sacrificial server of claim 44, wherein the sacrificial server is examined for virus activity.

47. The sacrificial server of claim 46, wherein the sacrificial server determines whether the original message attachment has been altered through the use of an algorithmic technique.

48. The sacrificial server of claim 47, wherein the algorithmic technique is a check-summing technique.

49. The sacrificial server of claim 47, wherein the algorithmic technique is a hashing technique.

50. The sacrificial server of claim 47, wherein the algorithmic technique is a Boolean exclusive-or technique.

51. The sacrificial server of claim 47, wherein the algorithmic technique is a digital-subtraction technique.

52. The sacrificial server of claim 46, wherein the sacrificial server further comprises a read-only device and is rebooted from a safe copy of an operating system obtained from the read-only device.

53. The sacrificial server of claim 44, wherein communications between the network and the sacrificial server are authenticated using a challenge-and-response technique.

54. The sacrificial server of claim 44, wherein the sacrificial server stores a list of approved attachment file types and extensions, determines whether the attachment is of a file type or extension which is in the list of approved attachment file types and extensions, and, if the attachment is not of a file type or extension which is in the list of approved attachment file types and extensions, and informs the network that a message containing a non-approved attachment has been received.

55. The sacrificial server of claim 44, wherein the sacrificial server maintains a list of approved executable code, determines whether the attachment contains executable code and whether the executable code is in the list of approved executable code, and deactivates the executable code if the executable code is not in the list of approved executable code.

56. The sacrificial server of claim 55, wherein the list of approved executable code includes information for determining whether the approved executable code has been altered, if the executable code is in the list of approved executable code, the sacrificial server determines whether the executable code has been altered, and the executable code is deactivated if the executable code has been altered.

57. The sacrificial server of claim 44, wherein the sacrificial server is an emulated or partitioned execution space on a host computer.

58. An article of manufacture including a non-transitory computer-readable medium having instructions stored thereon, execution of which by a computing device causes the computing device to perform operations comprising:
receiving an original message comprising an executable code in a gatekeeper server;
forwarding the original message from the gatekeeper server to a sacrificial server;
creating from the original message a non-executable format message by using one of a plurality of application-level conversion processes selected in accordance with a type of the message, the non-executable format retaining an appearance, human readability and semantic content of the original message; and
forwarding the non-executable format message to an intended recipient of the original message.

59. The article of manufacture of claim 58, wherein the creating comprises:
maintaining a list of approved attachment file types and extensions;
determining whether the attachment is of a type or extension which is in the list of approved attachment file types and extensions; and
if the attachment is not of a type or extension which is in the list of approved attachment file types and extensions, informing the recipient that a message containing a non-approved attachment has been received.

60. The computer readable medium article of manufacture of claim 58, wherein the creating comprises:
maintaining a list of approved executable code;
determining whether the executable code is in the list of approved executable code; and
deactivating the executable code if the executable code is not in the list of approved executable code.

61. The article of manufacture of claim 58, wherein the gatekeeper server and the sacrificial server are implemented as virtual machines.

62. An apparatus for protecting against a potentially virus infected message, the apparatus comprising:
a gatekeeper device configured to:
receive an original message attachment from a network, and
forward the original message to a sacrificial server, wherein the sacrificial server is configured to create from the original message attachment a non-executable format message attachment by using one of a plurality of application-level conversion processes selected in accordance with a type of the message, the non-executable format retaining an appearance, human readability and semantic content of the original message and for returning the non-executable format message attachment to the network.

63. The apparatus of claim 62, wherein the gatekeeper device and the sacrificial server are implemented as virtual machines.

64. A system comprising:
a gatekeeper device configured to receive an original message comprising an executable code; and
a sacrificial processor configured to:
receive the original message from the gatekeeper device,
create from the original message a non-executable format message by using one of a plurality of application-level conversion processes selected in accordance with a type of the message, the non-executable format retaining an appearance, human readability and semantic content of the original message, and
forward the non-executable format message to an intended recipient of the original message.

* * * * *

UNITED STATES PATENT AND TRADEMARK OFFICE
CERTIFICATE OF CORRECTION

| | | |
|---|---|---|
| PATENT NO. | : 7,913,078 B1 | Page 1 of 1 |
| APPLICATION NO. | : 11/650561 | |
| DATED | : March 22, 2011 | |
| INVENTOR(S) | : Stewart et al. | |

It is certified that error appears in the above-identified patent and that said Letters Patent is hereby corrected as shown below:

Title Page 2, item (56), under "Other Publications", in Column 1, Line 8, delete "htto:" and insert -- http: --.

Column 10, line 60, in Claim 47, delete "through the use" and insert -- through use --.

Column 12, line 10, in Claim 60, delete "The computer readable medium article" and insert -- The article --.

Signed and Sealed this
Twelfth Day of July, 2011

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,913,078 B1 |
| APPLICATION NO. | : 11/650561 |
| DATED | : March 22, 2011 |
| INVENTOR(S) | : Stewart et al. |

It is certified that error appears in the above-identified patent and that said Letters Patent is hereby corrected as shown below:

Column 3, line 17: Replace "program or system" with -- program or system. --

Column 3, line 43: Replace "unauthorized form" with -- unauthorized forms --

Column 3, line 63: Replace "imbedded hyperlinks" with -- embedded hyperlinks --

Column 4, line 20: Replace "attachment from" with -- attachment form --

Column 5, line 31: Replace "techmque is" with -- technique is --

Column 5, line 32: Replace "authentication techmques." with -- authentication techniques. --

Column 6, line 2: Replace "content the particular" with -- content of the particular --

Column 6, line 58: Replace "Several techmques" with -- Several techniques --

Column 8, line 51: Replace "algorithmic techmque." with -- algorithmic technique. --

Column 10, line 63: Replace "techmque is a" with -- technique is a --

Column 10, line 65: Replace "techmque is a hashing techmque" with -- technique is a hashing technique --

Column 10, line 67: Replace "techmque is a" with -- technique is a --

Column 11, line 2: Replace "digital-subtraction techmque" with -- digital-subtraction technique --

Column 11, line 16: Replace ", and informs the network" with -- , informs the network --

Signed and Sealed this
Sixth Day of December, 2011

David J. Kappos
*Director of the United States Patent and Trademark Office*